United States Patent Office

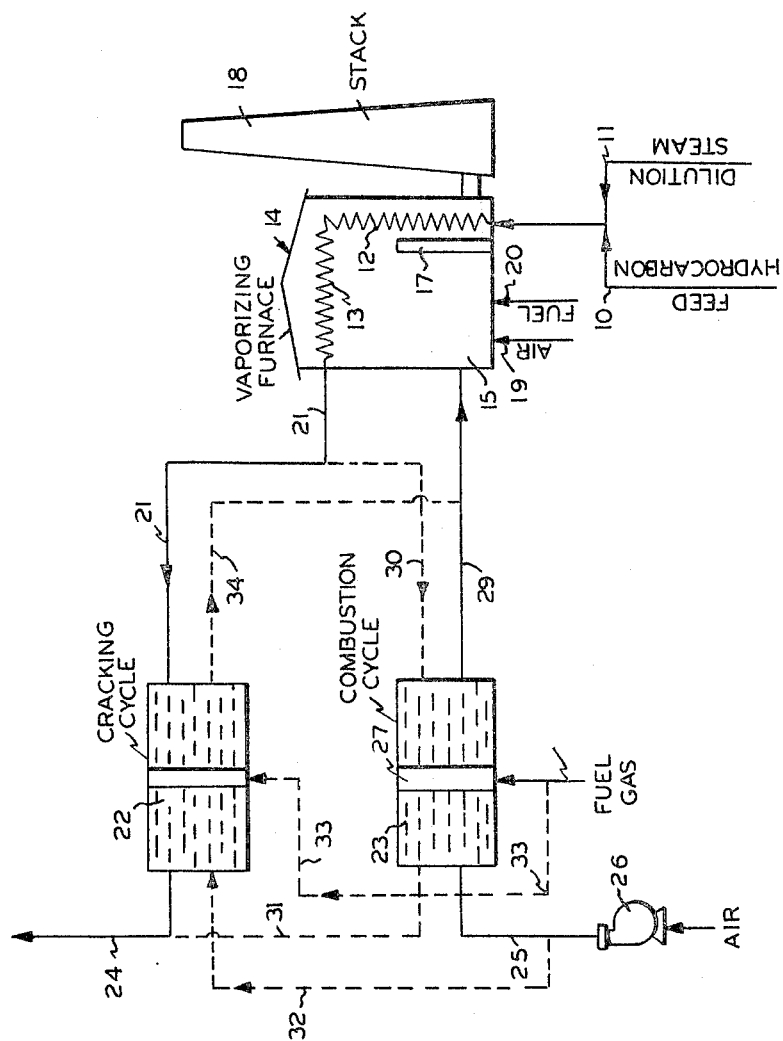

3,270,078
Patented August 30, 1966

3,270,078
PROCESS AND REGENERATIVE FURNACE SYSTEM FOR THE PYROLYSIS OF HYDROCARBONS
Marcel J. P. Bogart, London, England, assignor to The Lummus Company, New York, N.Y., a corporation of Delaware
Filed Apr. 29, 1963, Ser. No. 276,240
7 Claims. (Cl. 260—679)

The present invention is directed to an improved process for effecting the pyrolysis of hydrocarbons in a regenerative furnace system. More particularly, the present invention is directed to an improved process for effecting the pyrolysis of hydrocarbons in a regenerative furnace system, and corresponding apparatus, whereby the thermal efficiency of the regenerative furnace is improved by the recovery of a substantial amount of energy from the combustion cycle of the furnace system.

Regenerative furnace systems are well known for use in cracking hydrocarbons to produce acetylene and ethylene, for example. As a specific example of a regenerative furnace system, reference is made here to the article entitled, "Acetylene From Hydrocarbon Feed Stocks," in Industrial and Engineering Chemistry volume 45, page 2596.

The regenerative furnace system includes at least one pair of furnaces of a box-type construction which is lined with insulation and a refractory material. The inside of each furnace, except for a small combustion zone at the center, is filled with refractory tiles of special design. The ends of the furnace are provided with plenum boxes and baffles for the proper distribution of feed to the furnace.

These furnaces are preferably operated in pairs on a regenerative cycle, heat being removed from the refractory tiles by the cracking of the hydrocarbon feed and being restored by the combustion of fuel gas with preheated air. A complete cycle for each furnace consists of a cracking step and a combustion step in the forward direction followed by a cracking step and a combustion step in the reverse direction. Each step usually occurs for approximately one minute. The time of these steps may, however, be varied as desired. However, it is to be understood that, as pointed out in the publication referred to, the time the feed is in the furnaces or at cracking temperature is of shorter duration; such time periods are of the order of less than 0.1 second and less than 0.05 second, respectively. A description of the operation follows, with a pair of furnaces being designated (A) and (B), for purposes of illustration.

Step (1).—A steam-hydrocarbon mixture is introduced at the front end of a furnace (A); cracking occurs and the resulting cracked gases are withdrawn from the back of furnace (A). The cracked gases are then quenched and are purified. While cracking is being effected in furnace (A), air is introduced at the front of a second furnace (B) and is preheated by the refractory tile before reaching the combustion zone thereof. Fuel gas is admitted to the combustion zone of (B) and hot combustion gases (flue gases) pass through other refractory tiles and heat the same, pass out the back of furnace (B), and are removed from the system.

Step (2).—Furnace (A) is heated by routing air therethrough in the opposite direction to that described in Step (1), i.e., back to front through (A). Fuel gas is admitted to the combustion zone of (A) and is oxidized by the air. Flue gases are removed from the front of furnace (A), are quenched and are taken from the system. Here again, as furnace (A) is being heated, furnace (B) is operated for the other reaction, namely, cracking of hydrocarbon feed. A steam-hydrocarbon mixture is brought into the back end of furnace (B). Cracking occurs and the resulting cracked gases are removed from the front end of (B). Quenching and purification of the cracked gases follow.

Step (3).—Furnace (A) is next operated for cracking of the hydrocarbon feed. However, steam and the feed are fed into the back of (A) and cracked gases are removed from the front of (A). The gases are quenched and are purified. While (A) is so operated, furnace (B) is heated by introducing air at the back thereof. As air flows from the back to the front of (B), it reacts with fuel gas fed into the combustion zone thereof. Flue gases are taken from the front of (B) and are removed.

Step (4).—To complete the sequence, furnace (A) is heated by passing air through the back thereof such that it reacts with fuel gas introduced into the combustion zone of (A). Flue gases are taken from the front of (A) and are removed. At essentially the same time, furnace (B) is operated for cracking of the hydrocarbon feed. A steam-hydrocarbon feed mixture is passed to the front of (B). Cracked gases exit from the back of (B), are quenched and are purified.

The two essential operations—cracking and combustion—of each of Steps (1) through (4), above, will occur essentially simultaneously in a "twin" pair of furnaces, so that there will be a continuous introduction of the vapors and a like continuous discharge of cracked hydrocarbons from the furnace system. A pair, or pairs, of furnaces is employed with appropriate switch valves operating as disclosed in the aforementioned publication.

Although the regenerative furnaces are generally operated at about ½ atmosphere absolute pressure in both the combustion and cracking cycles when acetylene is the preferred product, it is preferred to operate at one to two atmospheres absolute pressure when ethylene is the preferred product. The charge (hydrocarbon+steam) rate is increased for ethylene production, so that the residence time of the feed is of the same order it would be if the furnace were maintained at ½ atmosphere absolute pressure.

The following table better illustrates furnace operating conditions where the major olefinic product desired is either ethylene or acetylene.

*Preferred operating conditions in regenerative furnaces*

| Major olefinic product | Total pressure, atmospheres absolute | Steam hydrocarbon, ratio lbs./lbs. | Residence time, seconds | Cracking temperature, ° F. |
|---|---|---|---|---|
| Ethylene | 1–2 | 0.5–2.0 | 0.05–0.15 | 1,500–1,800 |
| Acetylene | 1 | 3–6 | 0.02–0.08 | 1,800–2,200 |
| Do | ½ | 2.5–5 | 0.02–0.08 | 1,800–2,200 |

It has been observed that the acetylene yield approaches the theoretical maximum as the steam-hydrocarbon ratio is increased, but economic considerations limit the amount of steam to practical limits. Yields of acetylene under optimum conditions may vary from 25 to 40% by weight of hydrocarbon charge to the furnaces.

Where ethylene is the preferred major product, an increase in feed rate also increases the production capacity of a given furnace. For instance, if the pressure is one atmosphere, the production capacity would be about double that at ½ atmosphere; however, if the pressure on the furnace is too high, polymerization and loss of the olefins to higher molecular weight products can occur in the cooler parts of the checker work. Hence, the preferred choice of pressure is about one to two atmospheres.

Detailed investigations of the regenerative furnace system have shown the possibility of improvement in the thermal efficiency of the cracking step by the recovery of heat from the combustion gas exiting from a furnace during the combustion part of the cycle. This gas leaves at a temperature between about 800 to 900° F. and hence still contains a substantial amount of energy. In the case of vacuum cracking, it is necessary for good economy to chill this gas to near cooling water temperature in order to minimize the power requirement of the combustion gas vacuum pump. This is normally done by a direct contact type of cooler and this quantity of energy is dissipated into cooling water. In the case of cracking at near atmospheric pressure, the gas is normally sent to the stacks so that the energy content is not recovered, the only advantage being the elimination of the vacuum pump and its forecooling apparatus.

The recovery of the portion of the energy content of the combustion gas by conventional means, such as waste-heat boiler or other indirect heat exchanger apparatus, has been considered. One obvious disadvantage is the fact that the combustion gas is not very clean and contains particles of carbon, tar and heavy hydrocarbon liquids.

The present invention circumvents all of the above-mentioned problems in addition to providing efficient equipment for the recovery of the energy content of the combustion gas exiting during the combustion part of the cycle in the regenerative furnace system.

It is an object of the present invention, therefore, to provide an efficient system to achieve thermal efficiency of the cracking step in a regenerative cracking system.

It is another object of the present invention to provide such improvement in a regenerative cracking system by the recovery of heat from the combustion gas exiting from a regenerative furnace during the combustion part of the cycle. Other objects of the invention will appear from the following description of the invention.

The present invention is concerned with the cracking of low-boiling hydrocarbons utilizing apparatus which comprises a pair of regenerative furnaces constructed to operate in the manner described above, and which includes a vaporizing furnace to recover the heat remaining in the flue gases from the combustion step of the furnaces.

The invention will appear more clearly from the following detailed description when taken in conjunction with the accompanying schematic flow diagram which shows, by way of example, a preferred embodiment of the inventive concept.

A low-boiling, feed hydrocarbon in line 10 and dilution steam in line 11 are passed through coils 12 and 13 arranged in vaporizing furnace 14. Coil 13 is positioned in the upper portion of combustion zone 15 of the furnace 14, and coil 12 is positioned in a convection zone 16 of the furnace. A baffle 17 is positioned adjacent the coil 12, as shown in the drawing. A stack 18 is in gas communication with the convection zone 16 of the furnace 14 for withdrawing the products of combustion therefrom. Air and fuel are introduced into the combustion zone 15 of the furnace 14, through lines 19 and 20, respectively.

The vaporized feed hydrocarbon withdrawn from the furnace 14 (and coils 12 and 13) through line 21 is passed to the regenerative furnace system which includes the pair of furnaces 22 and 23. As illustrated, the furnaces are arranged such that furnace 22 is in its cracking cycle and furnace 23 is in its combustion cycle. A complete cycle for the furnace system includes a cracking cycle and a combustion cycle for each furnace 22 and 23. Appropriate switch valves (not shown) switch the two furnaces 22 and 23 back and forth through their cracking to their combustion cycles.

The feed hydrocarbon in line 21 is introduced into furnace 22, which is shown in its cracking cycle. In the furnace 22, the feed hydrocarbon is cracked and the cracked gas is withdrawn through line 24 and passed to quench and purification systems (not shown), which are well known in the art.

Furnace 23, shown in its combustion cycle, is supplied with air through line 25 by blower 26. Air is introduced into the furnace 23 and is preheated by the refractory mass before it reaches the combustion zone 27 located approximately in the center of the furnace 23. Fuel gas is introduced into the combustion zone 27 through line 28 and hot combustion gases are passed through the refractory mass to heat the checker work for subsequent cracking of the feed hydrocarbon and are subsequently withdrawn from the furnace 23 through line 29.

The hot combustion gases in line 29 are passed to the combustion zone 15 of the vaporizing furnace 14 to provide for an efficient recovery of heat from the combustion cycle. Thus, the thermal efficiency of the cracking step included in the regenerative furnace system is greatly improved by the recovery of heat from the combustion gas exiting from the furnace during the combustion part of the cycle. The combustion gas withdrawn from furnace 23 is at a temperature at high as 800 to 900° F., and still contains a substantial amount of energy which is effectively and efficiently recovered in accordance with my invention.

It is to be understood that when furnace 22 is operated on a combustion cycle and furnace 23 on a cracking cycle, the flow of reactants and products will be reversed to the flow cycle described immediately above. In such case, the vaporized feed hydrocarbon in line 21 is passed through line 30 and is introduced into furnace 23 which is in its cracking cycle. Cracked gas is removed from furnace 23 through line 31 and is passed through line 24 to quench and purification systems (not shown). Correspondingly, when furnace 22 is being preheated, air is introduced into furnace 22 through lines 25 and 32 and is preheated by the refractory mass in the front portion of the furnace. Fuel gas is introduced into furnace 22 via lines 28 and 33 and is burned in the combustion zone of the furnace. Hot combustion gases are removed from furnace 22 through lines 34 and 29 and thence into combustion zone 15 of the vaporizing furnace 14.

The system as shown in the accompanying drawing illustrates the application of the present invention to cracking and combustion operations at or about atmospheric pressure. This is exemplified by the production of ethylene from hydrocarbons, as discussed above. For use in vacuum cracking, such as in the production of acetylene, it is necessary to introduce a vacuum-pumping device (not shown) into the flue gas circuit to provide for a flow of hot flue gases from the combustion zone 27 to the vaporizing furnace 14 and is placed between the regenerative furnaces 22 and 23 and the furnace 14. In this case, it is necessary to utilize some of the energy content of the hot combustion gases in a vacuum pump forecooler, but an overall gain is accomplished by the recovery of the heat of compression.

It is to be understood that a variety of hydrocarbons can be used as the charge or feed in the present invention. For the manufacture of acetylene and ethylene, there may be used: ethane, propane, butane, natural gas, gasolines, light petroleum distillates, etc. For the manufacture of acetylene without simultaneous production of ethylene, methane can serve as the hydrocarbon feed.

While emphasis has been placed herein on cracking of hydrocarbons in a regenerative furnace system to produce acetylene and ethylene, it is to be understood that the system can be used for cracking of hydrocarbons to form still other products. For example, methane can be pyrolzed to carbon black and hydrogen, and to benzene; naphtha can be pyrolyzed to butadiene; etc. Correspondingly, the furnaces can be operated with or without catalysts therein. Known cracking catalysts, such as silica-alumina, bauxite, silica-zirconia, alumina-molybdena, alumina-chromia. When catalysts are used, operating temperatures are lower than when catalysts are omitted.

While a preferred embodiment of the present invention has been illustrated and described, variations thereof may be made by one skilled in the art; and, therefore, the invention as disclosed hereinabove is intended to be limited only by the scope of the disclosure and the appended claims.

I claim:
1. A method for improving the thermal efficiency of a regenerative furnace system for the pyrolysis of a hydrocarbon feed and including a pair of regenerative furnaces having a pyrolysis and preheat phase which comprises:
   (a) preheating said hydrocarbon feed by indirect heat exchange in a combustion chamber;
   (b) introducing said preheated hydrocarbon feed into a regenerative furnace during the pyrolysis phase;
   (c) withdrawing pyrolysis gases from the regenerative furnace of step (b);
   (d) simultaneously with step (b) introducing fuel and a combustion supporting medium to a second regenerative furnace during the preheat phase thereof;
   (e) withdrawing products of combustion from the regenerative furnace of step (d);
   (f) admixing the products of combustion of step (e) with a combustion supporting medium in said combustion chamber; and
   (g) thereafter reversing the phases of said regenerative furnaces.

2. The method defined by claim 1, wherein said regenerative furnace system is operated under a vacuum.

3. The method defined by claim 1, wherein said regenerative furnace system is operated at approximately atmospheric pressure.

4. The method defined by claim 1, wherein the feed hydrocarbon is a petroleum distillate which is converted to a product containing acetylene and ethylene.

5. The method defined by claim 1, wherein the feed hydrocarbon is methane which is converted to a product containing acetylene.

6. The method of claim 1 wherein fuel and a combustion supporting medium are introduced into said combustion chamber whereby together with the products of combustion and combustion supporting medium of step (f) provide the heat requirements necessary to preheat the hydrocarbon feed on said combustion zone.

7. In a regenerative furnace system for the cracking of hydrocarbons having cracking and regenerative cycles and including a pair of regenerative furnaces A and B, each operating alternately in said cracking and regenerative cycles, said regenerative cycle of said furnace A and said cracking cycle of said furnace B occurring essentially simultaneously, said furnace system provided with means for alternating such cycles, the improvement comprising: means for improving the thermal efficiency of the cracking cycle in each said furnace including a vaporizing furnace; said vaporizing furnace having a combustion chamber and a convection chamber; means for supplying fuel and air to said vaporizing furnace; conduit means for supplying feed hydrocarbon to said regenerative furnaces during the respective cracking cycle thereof; said conduit means including means for passing said hydrocarbon feed through said convection and combustion chambers of said vaporizing furnace prior to introduction into a regenerative furnace during the cracking cycle thereof; means for removing cracked hydrocarbons from a regenerative furnace during the cracking cycle thereof; a combustion chamber included in each regenerative furnace; means for supplying air and fuel to the combustion chamber of said regenerative furnaces during the respective regenerative cycle thereof; said regenerative furnaces being heated by the products of combustion of said air and fuel in said combustion chamber thereof during said regenerative cycle; and means for passing said products of combustion from a regenerative furnace during the regenerative cycle to said vaporizing furnace to supply heat thereto, whereby the heat in said products of combusition is recovered and is utilized to improve the thermal efficiency of the cracking cycle of said regenerative furnace system.

References Cited by the Examiner

UNITED STATES PATENTS

| 2,514,497 | 7/1950 | Jones | 260—683 |
| 2,816,941 | 12/1957 | Goins | 260—679 |
| 2,868,855 | 1/1959 | Begley | 260—683 X |
| 2,956,864 | 10/1960 | Coberly | 260—683 X |

FOREIGN PATENTS 759,784  10/1956  Great Britain.

DELBERT E. GANTZ, *Primary Examiner.*

G. E. SCHMITKONS, *Assistant Examiner.*